March 16, 1926.
O. A. HANFORD
1,576,744
APPARATUS FOR BLOWING GLASSWARE
Filed August 22, 1921  2 Sheets-Sheet 1
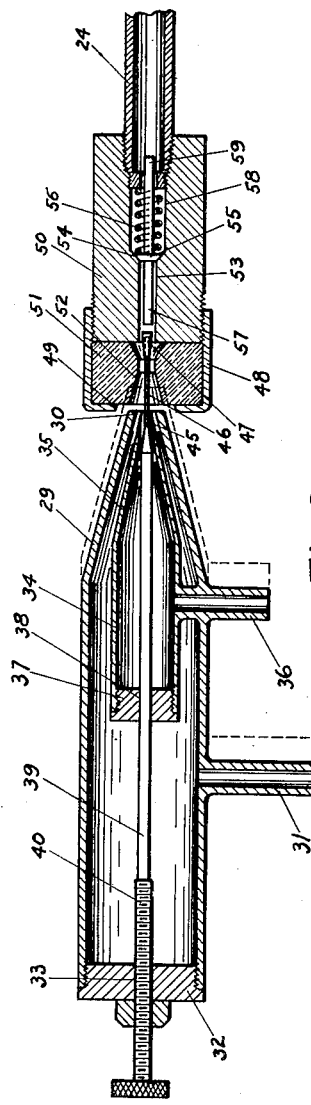
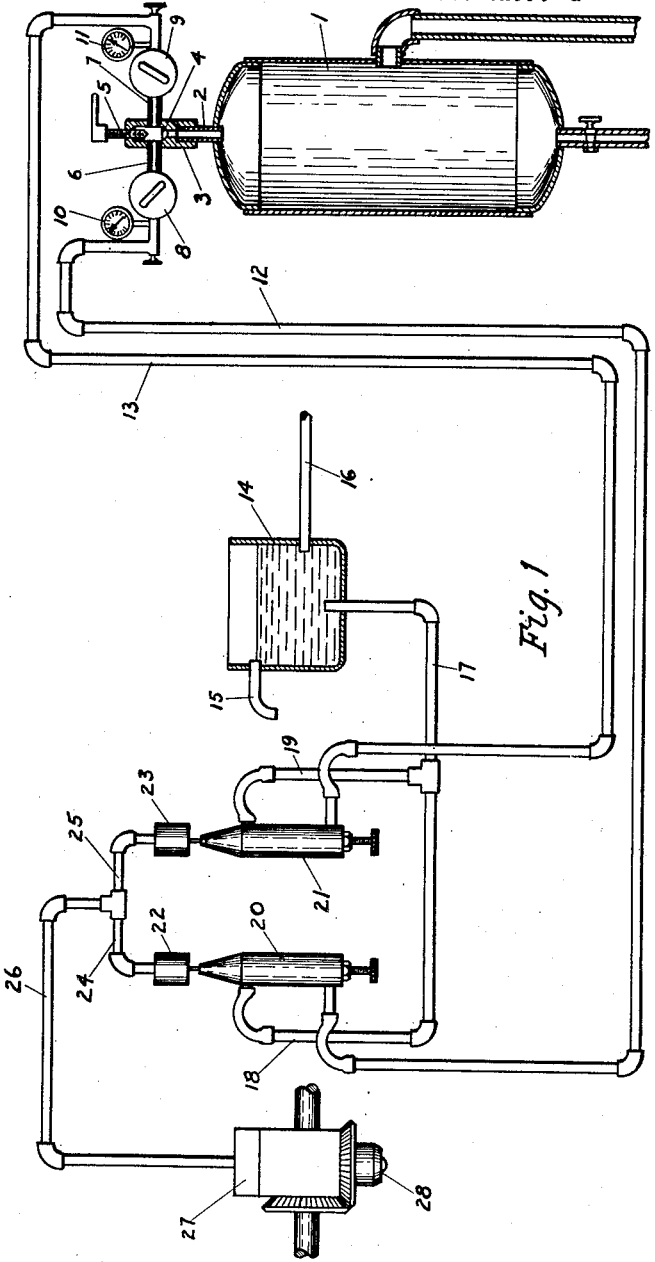
INVENTOR.
Orin A. Hanford
BY
Edwin P. Corbett
ATTORNEY.

March 16, 1926.

O. A. HANFORD

APPARATUS FOR BLOWING GLASSWARE

Filed August 22, 1921  2 Sheets-Sheet 2

1,576,744

Orin A. Hanford INVENTOR.

BY

Edwin P. Corker ATTORNEY.

Patented Mar. 16, 1926.

1,576,744

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO.

APPARATUS FOR BLOWING GLASSWARE.

Application filed August 22, 1921. Serial No. 494,078.

*To all whom it may concern:*

Be it known that I, ORIN A. HANFORD, a citizen of the United States of America, residing at Columbus, in the county of Franklin and State of Ohio, have invented certain new and useful Improvements in Apparatus for Blowing Glassware, of which the following is a specification.

My invention relates to apparatus for blowing glass ware and has to do particularly with the introduction of compressed air into the blanks both during the intermediate and final stages of formation.

In the past, the introduction of air into the blank has been the cause of a very high percentage of waste, particularly in the making of high-grade ware. It has not been fully realized but it is a fact that this waste is due to improper methods of producing and introducing compressed air into the blank. The use of these improper methods has resulted in oil and water marks in the product that make it unfit for sale as high-grade ware.

The defects primarily arise from the passage of the air in contact with oiled surfaces on its way to the blank. This may arise from the passing of the air through a plurality of rotating sleeves which must be oiled, or it may result from the use of a reciprocating pump frequently mounted closely adjacent to the blowing head and generally used for introducing what is known as "puff" air into the blank.

My invention eliminates all possibility of oil or water marks by an extremely simple and yet novel method. Briefly stated, this method comprises the utilization of a continuous flow of air but an intermittent application of such air to the blowing head.

My novel method is preferably performed by utilizing intermediately separable pipe structure units which are continuously supplied with air but which are separated whenever the air is not desired to reach the blank. Whenever this separated condition is attained, however, the air flows freely to the atmosphere with the result that all danger of condensation in the pipe is avoided.

The type of apparatus that I preferably use in the performance of my method is shown in the accompanying drawings wherein similar characters of reference designate corresponding parts and wherein—

Figure 1 is a diagrammatic illustration of the apparatus preferably used by me.

Figure 2 is a detail view of the nozzle construction that I desirably use to effect the intermittent separation of the pipe units.

Figure 3:
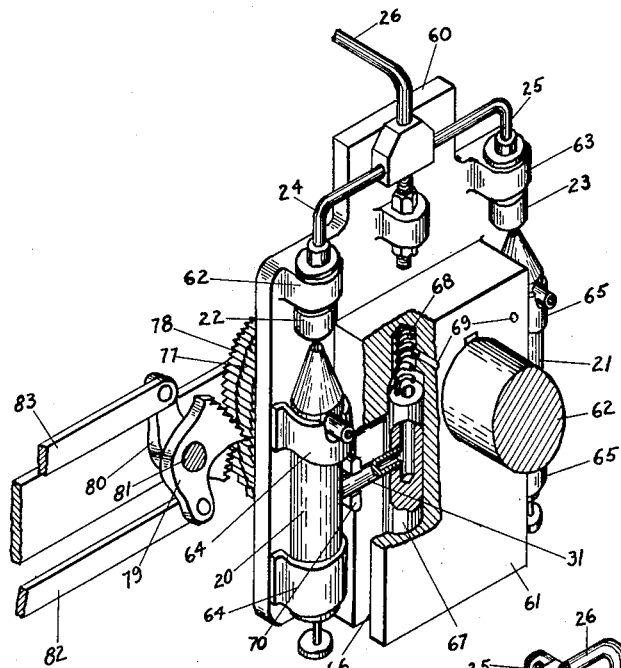
Figure 3 is a perspective view partially broken away of the apparatus operating the separable pipe units in my structure.

In the drawings, the apparatus to which my invention relates will in all probability comprise a number of blowing heads designed to retain the blank and at the same time permit of the introduction of air into such blank. However, my method and also my apparatus for performing the same, can probably best be illustrated by the description of a single blowing head together with the mechanism appertinent thereto.

Therefore, I have shown diagrammatically an air pressure reservoir 1 having an outlet pipe 2 in the upper end thereof. This outlet pipe 2 carries a valve casing 3 having a valve seat 4 and a valve 5 which may be moved into cooperative relation with the seat 4 so as to prevent the escape of air from the reservoir 1 when desired.

Extending from opposite sides of the valve casing 3 are pipes 6 and 7 having reducing valves 8 and 9 which may be provided with the proper gauges 10 and 11. These pipes 6 and 7 in turn connect to pipes 12 and 13 which lead to nozzles structures.

Likewise, I desirably use an air moistening device embodying a tank of water 14 with an overflow pipe 15, a supply pipe 16 and an outlet pipe 17. The outlet pipe 17 connects to pipes 18 and 19 that in turn connect with the nozzle structures.

Each blowing head is desirably provided with two nozzle units which may broadly be designated 20 and 21. These nozzle units are movable into and out of communication with receiving heads 22 and 23. The receiving heads 22 and 23 in turn connect with pipes 24 and 25 communicating with a single pipe 26 that in turn passes directly into the glass retaining head structure 27 and thence into the blank which is retained in the head 28.

Figure 4:
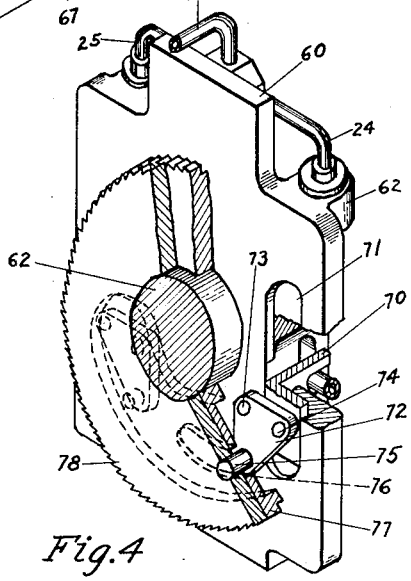
Figure 4 is a perspective view partially broken away of the opposite side of the structure shown in Figure 3.

These nozzle units 20 and 21 are alternately movable into cooperative relation with the receiving heads 22 and 23 by suitable mechanism (see Figures 3 and 4). One nozzle unit is designed to introduce what is known as "puff" air into the blank, being usually rendered effective for brief but successive intervals. The other nozzle member is provided with mechanism for moving it into position to effect final blowing of the article and usually moving into this position only once during the formation of an article and this once after the puffing and elongation of the blank has been completed. The nozzle structures are the same.

Each nozzle structure preferably takes the form of a substantially cylindrical casing with one end tapered as at 29 and having a small opening in this tapered end as at 30. Intermediate its length, it is provided with a branch pipe structure 31 for connection with the air pipes 12 and 13. It is further provided at its non-tapered end with a threaded plug-like cap 32 having a threaded aperture therein as at 33.

Within the tapered end of the nozzle structure, I preferably provide a somewhat similar nozzle structure of reduced dimensions embodying a casing 34 tapered as at 35 and having a branch pipe 36 extending outwardly therefrom and through the walls of the nozzle, where it is to be connected with either of the pipes 18 or 19. This member 34 is further provided at its rear end with a threaded plug-like closure 37 having an aperture therein as at 38.

As shown in Figure 2, the smaller nozzle member 34 has its tapered end extending well up into the tapered end 29 of the main nozzle, a slight space being provided between its outer walls and the inner wall of the tapered portion 29 so as to permit the passage of air therethrough.

A needle valve 39 is threaded as at 40 and is thereby adjustably carried within the threaded aperture 33 of the plug-like closure 32. It extends through the aperture 38 in the plug-like closure of the smaller nozzle unit and extends well up into the aperture 45 in the tapered end 35 of this smaller nozzle. It is adjustable within this opening to regulate the amount of moisture that will be drawn through this smaller nozzle structure by the air delivered into the main nozzle member through the pipe 31. The operation is on the familiar principle of the inspirator and the air which passes will be laden with moisture to a degree that will be governed by the position of the needle valve. It will be understood that the water within the tank 14 is preferably maintained at a constant level and at such a level that the water delivered in-to the nozzle will be drawn in entirely by the suction of the air and will not be forced in under any head pressure whatever.

The needle valve 39 is provided upon its forward extremity with a reduced extension 46 having a conical cap 47 which is adapted to extend into the receiving head and unseat the valve therein in a manner to be described.

Each of the receiving heads 22 and 23 of the nozzle structure preferably comprises a cap 48 with a flaring aperture 49. This cap 48 is internally threaded for mounting upon the body portion 50 of the head and in conjunction with this head it forms a chamber for the reception of a plug 51 that is desirably of an elastic material. This plug 51 is provided with a central flaring opening 52 which is designed to form the seat for the tapered end of the nozzle member, whenever this nozzle member is moved into position for delivery of air into the blank. Means is provided for automatically moving this nozzle member into operative position at the proper time. The operative position is illustrated by dotted lines in Figure 2.

The body portion of the head 50 is preferably provided with a duct 53 that terminates in the valve seat 54 upon which normally rests a valve 55. This valve is held in position upon its seat by means of a coil spring 56 embodying the valve stem 57. The seat 54 of the valve structure is extended to form a cylindrical chamber 58 that in turn connects with either of the pipes 24 or 25 leading by means of the pipe 26 to the blowing head. It will be noted that the valve carries an inwardly extending stem member 59.

The structure for operating the separable pipe units, that is, for moving the nozzle members alternately into position to deliver air to the blank, is shown best in Figures 3 and 4. It comprises a main supporting plate 60 having an integral block structure 61 formed thereon which is carried by the shaft 62. The operating unit for this entire unit need not be shown or described for the purpose of this invention The nozzles 20 and 21, with their receiving heads 22 and 23, are mounted on opposite sides of the integral block formation 61, the receiving heads 22 and 23 being held firmly in position by the bosses 62 and 63 and the nozzles being slidably supported on the plate 60 by bands 64 and 65.

The branch pipe 31 of each of the nozzle units 20 and 21 extends into a slot 66 in the side of the integral block formation 61. Each of these branch pipes 31 is at its inner end threaded into a cylindrical conduit member 67 with its outer end only open and normally held at the bottom of its supporting channel by a coil spring 68. Air is introduced into the interior of this conduit and consequently to the nozzles 20 and 21 by means of a duct 69 which is in communication with a series of channels (not shown) which channels lead from the pipes 12 and 13.

Each of the branch pipes 31 is embraced by a bifurcate member 70 having a slidable support in a slot 71 of the base plate 60. These bifurcate members are reciprocated to bring the nozzles into contact with their receiving heads by means of the bearing crank unit 72 fulcrumed as at 73 and connected to the reciprocating members as at 74. As shown in Figure 4, this unit carries a laterally extending pin 75 passing through an arcuate slot 76 in a ratchet wheel 77 and into a ratchet wheel 78. These ratchet wheels are designed to be operated independently by serrated pawl members 79 and 80 which are fulcrumed as at 81 and which are operable by pull rods 82 and 83. It will be understood that the nozzle member 21 is operated by the ratchet wheel 77 by means of a structure similar to that shown in Figure 4 with the exception that the pin is directly connected to the ratchet wheel 77 and does not extend beyond the same. It will be obvious that whenever either of the rods 82 or 83 is pulled, the ratchet wheel complemental thereto will be partially rotated so as to bring its nozzle member into cooperative relation to its receiving head.

In operation, at the proper instant, the nozzle member is automatically moved from its full line position in Figure 2 to its dotted line position shown in Figure 2. When it reaches this dotted line position, the conical cap 47 of the needle 39 has struck the stem member 59 of the valve and lifted it so that the moisture-laden air may pass freely by the valve and into the pipe 24 or the pipe 25, depending upon the nozzle being operated. Before this movement from full line to dotted line position, air has been flowing freely through the branch pipe 31 and through the outlet 30 of the tapered nozzle 29, moisture being drawn with it. This freely flowing action continues during the movement into dotted line position and while the nozzle is in this dotted line position. Likewise, this free flowing continues during withdrawal and after withdrawal from dotted line position. Thus, the air is flowing freely at all times and there is no chance of any condensation of moisture in the nozzle structure or in the pipes leading to the blowing head, since it will be noted that the pipes leading from the receiving heads 22 and 23 to the blowing head are relatively short, being preferably little more than four inches in length. From this, it will be noted that I have provided an extemely simple device for maintaining the pipes clear of condensation and yet permitting the introduction of either "puff" or blowing air for either shorter or longer periods of time, without the necessity of utilizing an apparatus demanding the use of oil with its consequent danger of producing oil marks in the ware. The result is that I eliminate both oil marks and water marks from the ware. Furthermore, my device is of such a nature that I am enabled at all times to have a constant pressure of air and attain the result sought by varying the period of application in operation rather than by varying the pressure.

It will further be obvious that, by permitting the free flowing of the air while the nozzle 29 is in its lowered position, I have provided a means for preventing the accumulation of any sediment adjacent the outlet 30. If the nozzle 29 would be in permanent contact with the head 51 the stoppage of the flow of air by the valve 55 would cause the sediment to collect adjacent the outlet 30 and valve 55 and when the valve would be opened this collected sediment would be carried directly into the glass blank. Thus, by freely flowing the air into the atmosphere, during the closure of the valve 55, no accumulation of sediment or condensation of moisture will take place to subsequently injure the glass blank.

Having thus described my invention, what I claim is:

1. Means for introducing fluid to glass blanks comprising a pipe leading to the blank retaining head, a normally closed valve in said pipe, a nozzle structure through which fluid is adapted to flow continuously, means for moving said nozzle intermittently into position to supply fluid to said pipe and means for opening said valve prior to or at the instant of positioning of said nozzle.

2. Means for introducing fluid to glass blanks comprising a normally closed pipe leading to the blank retaining head, a fluid delivering nozzle, and means for moving said nozzle into position on said pipe for opening said pipe and supplying fluid thereto.

3. Means for introducing fluid to glass blanks comprising a normally closed pipe leading to the glass retaining head, a nozzle through which the fluid flows continuously, means for moving said nozzle into coacting relation with said pipe for supplying fluid thereto at the instant of contact, and an elastic compressible member interposed between said pipe and said nozzle for preventing leakage of the fluid.

4. Means for introducing fluid to glass blanks comprising a blow head, a plurality of nozzles movable to control the introduction of said fluid to said blow head and means for moving said nozzles alternately.

5. Means for introducing fluid to glass blanks comprising a blow head, a plurality of separable pipe elements movable to control the introduction of said fluid to said blow head, and means for moving said pipe elements from alternately separable into connected relative positions.

6. Means for introducing fluid to glass blanks comprising nozzles, a pipe having receiving heads for said nozzles, and means for moving said nozzles into cooperative relation with said heads for applying successively to a glass blank a low and a relatively high fluid pressure.

7. Means for introducing fluids to glass blanks comprising nozzles a pipe leading to said nozzles, receiving heads for said nozzles, and means for alternately moving said nozzles into cooperative relation with said receiving heads.

8. Means for introducing fluid to glass blanks comprising nozzles, a pipe leading to said nozzles, receiving heads for said nozzles, and independently operable ratchet members for moving said nozzles into cooperative relation with said receiving heads.

9. Means for introducing fluid to glass blanks comprising nozzles, a pipe leading to said nozzles, receiving heads for said nozzles, and independently operable ratchet members for alternately moving said nozzles into cooperative relation with said receiving heads.

10. Means for introducing fluid to glass blanks comprising a plurality of nozzles, a receiving head for each nozzle, a ratchet wheel and connected means for moving each nozzle into cooperative relation to its receiving head, and a serrated pawl for rotating each ratchet wheel at the proper instant to effect movement of its nozzle.

In testimony whereof I hereby affix my signature.

ORIN A. HANFORD.